United States Patent
Lee et al.

(10) Patent No.: US 8,645,210 B2
(45) Date of Patent: Feb. 4, 2014

(54) METHOD OF PROVIDING TARGETED COMMUNICATIONS TO A USER OF A PRINTING SYSTEM

(75) Inventors: Haengju Lee, Webster, NY (US); Shanmuga-nathan Gnanasambandam, Victor, NY (US); Yu-An Sun, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 205 days.

(21) Appl. No.: 13/100,636

(22) Filed: May 4, 2011

(65) Prior Publication Data

US 2011/0282736 A1 Nov. 17, 2011

Related U.S. Application Data

(60) Provisional application No. 61/345,340, filed on May 17, 2010, provisional application No. 61/345,377, filed on May 17, 2010, provisional application No. 61/345,301, filed on May 17, 2010, provisional application No. 61/345,289, filed on May 17, 2010.

(51) Int. Cl.
*G06Q 30/00* (2012.01)

(52) U.S. Cl.
USPC ........................ 705/14.49; 705/26.3; 358/1.12

(58) Field of Classification Search
USPC .............................. 705/14.49, 26.3; 358/1.12
See application file for complete search history.

(56) References Cited

U.S. PATENT DOCUMENTS

| | | | |
|---|---|---|---|
| 2002/0126304 A1* | 9/2002 | Jakobsson et al. | 358/1.12 |
| 2008/0140500 A1* | 6/2008 | Kurkure | 705/10 |
| 2009/0150365 A1 | 6/2009 | Chow et al. | |
| 2009/0157650 A1 | 6/2009 | Chow et al. | |
| 2009/0313060 A1 | 12/2009 | Evevsky | |
| 2010/0005486 A1 | 1/2010 | Gross | |
| 2010/0070373 A1* | 3/2010 | Zoeter | 705/14.71 |
| 2010/0088178 A1 | 4/2010 | Gnanasambandam et al. | |
| 2010/0198689 A1* | 8/2010 | Gonen et al. | 705/14.54 |

OTHER PUBLICATIONS

U.S. Appl. No. 61/345,340, filed May 17, 2010, Lee et al.
U.S. Appl. No. 61/345,301, filed May 17, 2010, Gnanasambandam et al.
U.S. Appl. No. 61/345,289, filed May 17, 2010, Gnanasambandam et al.
U.S. Appl. No. 61/345,377, filed May 17, 2010, Gnanasambandam et al.
U.S. Appl. No. 12/780,543, filed May 14, 2010, Gnanasambandam et al.
U.S. Appl. No. 12/780,267, filed May 14, 2010, Gnanasambandam et al.
U.S. Appl. No. 12/761,985, filed Apr. 16, 2010, Gnanasambandam.
Edelman, B. and Schwarz, M., "Optimal Auction Design in a Multi-Unit Environment: The Case of Sponsored Search Auctions," Unpublished manuscript, Harvard Business School, 2006.

(Continued)

*Primary Examiner* — John G Weiss
*Assistant Examiner* — Sam Refai
(74) *Attorney, Agent, or Firm* — Fay Sharpe LLP

(57) ABSTRACT

According to one aspect of the disclosure, provided are methods of providing user requested printed material, including one or more targeted communications to the user. According to one exemplary embodiment, the targeted communications are associated with an auction, whereby an optimal reserve price is determined to maximize profits.

21 Claims, 6 Drawing Sheets

(56) References Cited

OTHER PUBLICATIONS

Edelman, B., Ostrovsky, M. and Schwarz, M., "Internet Advertising and the Generalized Second-Price Auction: Selling Billions of Dollars Worth of Keywords," American Economic Association, vol. 97(1), pp. 242-259, Mar. 2007.
Google AdWords Select, https://www.google.co/accounts/ServiceLogin?service=adwords&hl; 2002.
U.S. Appl. No. 12/603,999, filed Oct. 22, 2009, Liu.
U.S. Appl. No. 12/540,051, filed Aug. 13, 2009, Liu et al.
U.S. Appl. No. 12/533,901, filed Jul. 31, 2009, Harrington.
U.S. Appl. No. 12/486,951, filed Jun. 18, 2009, Gnanasambandam et al.
U.S. Appl. No. 12/480,558, filed Jun. 8, 2009, Partridge et al.
U.S. Appl. No. 12/424,858, filed Apr. 16, 2009, Gnanasambandam et al.
U.S. Appl. No. 12/424,820, filed Apr. 16, 2009, Gnanasambandam et al.
U.S. Appl. No. 12/335,048, filed Dec. 15, 2008, St. Jacques, Jr. et al.
Myerson, R.B., "Optimal Auction Design," Mathematics of Operations Research, 6(1), pp. 58-73, 1981.
Shazam Entertainment Ltd., http://www.shazam.com/music/web/pages/background.html; 2002.
Talluri, K. and Van Ryzin, G., "The Theory and Practice of Revenue Management," Publisher Springer, 1st Edition, Feb. 23, 2005.
Ulku, L. "Optimal Combinatorial Mechanism Design," Unpublished Manuscript, Rutgers University, 2006.
Walsh, T., "Search on High Degree Graphs," IN Proceedings of IJCAI-2001, pp. 266-271, 2001.
Edelman, D. and Schwarz, M. "Optimal Auction Design and Equilibrium Selection in Sponsored Search Auctions," American Economic Review, vol. 100 (2); 7 pages, Copyright 2010.

* cited by examiner

METHOD OF PROVIDING TARGETED COMMUNICATIONS TO A USER OF A PRINTING SYSTEM

CROSS REFERENCE TO RELATED PATENTS AND APPLICATIONS

This application claims the benefit of priority to U.S. Provisional Application No. 61/345,340, filed May 17, 2010, entitled "OPTIMAL AUCTION MECHANISM FOR MULTI-LEVEL DEVICE CLICK-THROUGH (DCT) IN TARGETED PRINT COMMUNICATION," by Lee et al., U.S. Provisional Application No. 61/345,301, filed May 17, 2010, entitled "SYSTEM AND METHOD TO PRODUCE AND CONTROL SUBSIDIZATION OF TARGETED MATERIALS AT POINT OF SALE," by Gnanasambandam et al., U.S. Provisional Application No. 61/345,289, filed May 17, 2010, entitled "SYSTEM AND METHODS TO USE IN-PARTITE SCALE-FREE GRAPHS FOR INTERPRETING CONTEXTUAL INFORMATION AND TARGETING," by Gnanasambandam et al., and U.S. Provisional Application No. 61/345,377, filed May 17, 2010, entitled "METHOD FOR IDENTIFICATION, CATEGORIZATION AND SEARCH OF GRAPHICAL, AUDITORY AND COMPUTATIONAL PATTERN ENSEMBLES," by Gnanasambandam et al., each of which is hereby incorporated by reference in their entirety.

BACKGROUND

The present disclosure provides methods and systems for an optimal auction mechanism for targeted print communications associated with a printing system. In general, the methods and systems disclosed apply to users of any devices which can be connected to a printing system. For example, but not limited to, users of computers, mobile phones, etc. which can be networked to a printing system either directly or indirectly, such as through a cloud or other network configuration.

Some methods of providing on-demand printed or electronic communications, commonly advertisements, are known. For example, in United States Patent Publication No. 2010/0088178 methods of generating on-demand personalized print communications was proposed. Generally, as taught in the references incorporated herein, in an on-demand advertisement campaign, when there is a print or display request by users, keywords or hypemyms are generated by an advertisement aggregator based on the title, metadata, or text of a document and any additional user, consumer, or advertiser chosen information. At the same time, relevant user/consumer history and stored content related to the user is accessed from a database and used in the keyword generation process. The time, location, and user information can be sent together to advertisers or advertisement brokers or aggregators with the keywords. Advertisements related to the identified keywords, time, location, or any other data are selected and sent to the multifunction device and are printed/displayed along with the item requested by the user, such as a receipt, webpage, email, text message, instant message, document, credit card or bank statement, coupon, ticket, etc.

In addition, a method of giving feedback effectively to advertisers about their advertisements was proposed in co-pending U.S. patent application Ser. No. 12/761,985. The method of giving feedback is called print click-through ("PCT"), which is an alternative to "charge-per-click" online advertising pricing schemes (i.e., an online aggregator charging an advertiser for each click made on a hyperlink associated with the advertiser or the advertiser's goods or services). PCT methods could be utilized to track advertisements delivered to a user browsing advertisements on the internet using a personal computer, laptop, internet enabled cell phone or other communication device. Accordingly, PCT methods are applicable not only to physically printed documents, but also analogously applicable as device click-through ("DCT") methods for other devices, such as electronically "printed" communications (e.g., electronic displays of communications). Thus, click-through may alternatively be referred to as device click-through but it should be understood that the terms DCT and PCT are interchangeable because DCT includes PCT, and PCT methods are easily adaptable for non-print devices. In this disclosure, the click through rate may alternatively be referred to as response rate, but there is no difference in meaning. Several levels of PCT or DCT can be constructed depending on click-through speed, security level, the existence of user actions involved in promotional material and localization guarantees for user and device, as described in the incorporated references.

Currently, in advertising schemes, the cost of an advertising campaign is determined as fixed prices, by the size of the advertisement, or by the number of impressions. For example, an online advertisement aggregator may charge advertisers a fixed price for each click on a hyperlink or each view of a webpage associated with the corresponding advertiser (cost-per-click and cost-per-view advertising schemes), regardless of the advertiser of product/service being advertised. As another example, a newspaper may charge based solely on the physical size of the ad in the newspaper. As yet another example, a print shop may charge solely based on the number of pages printed. None of these currently utilized advertisement pricing schemes take into account other information which may be important in forming an optimal price for an advertising campaign that reflects the market value of the advertisement campaign and reflects the actual benefit delivered to the advertiser.

For example, in these prior art schemes, such as cost-per-click, or direct mailing campaigns of printed advertisements, an advertiser may spend a lot of money unnecessarily for delivery of advertisements to consumers who are completely uninterested in the advertisements (e.g., thousands of users may visit a webpage having an advertisement that is only directed or relevant to a limited group of consumers having a very particular need). In some cases, especially if cost-per-click or cost-per-view are the only available methods of advertising, many advertisers will simply choose not to advertise because they cannot target their advertisements to primarily interested consumers, and therefore end up spending money on advertisements which are delivered to uninterested consumers. However, there is also a need for the aggregator to receive fair compensation for more accurate delivery of advertisements to interested consumers.

INCORPORATION BY REFERENCE

The following Patent Applications, Patent Application Publications and Non-patent references are incorporated herein by reference in their entirety:

Gnanasambandam et al., U.S. patent application Ser. No. 61/345,301, filed May 17, 2010, entitled "System and Method to Produce and Control Subsidization of Targeted Materials at Point of Sale";

Gnanasambandam et al., U.S. patent application Ser. No. 61/345,289; filed May 17, 2010, entitled "System and Methods to Use In-Partite Scale-Free Graphs For Interpreting Contextual Information And Targeting";

Gnanasambandam et al., U.S. patent application Ser. No. 61/345,377; filed May 17, 2010, entitled "Method for Identification, Categorization and Search of Graphical, Auditory and Computational Pattern Ensembles";

Gnanasambandam et al., U.S. patent application Ser. No. 12/780,543, filed May 14, 2010, entitled "System and Method to Prearrange Hyper-local Value-Added Marketing Campaigns and Communication Along Consumer Trajectories";

Gnanasambandam et al., U.S. patent application Ser. No. 12/780,267, filed May 14, 2010, entitled "In-Situ Mobile Application Suggestions and Multi-Application Updates through Context Specific Analytics";

Gnanasambandam et al., U.S. Patent Application Publication No. US 2010/0088178 A1, published Apr. 8, 2010, entitled "System and Method for Generating and Verifying Targeted Advertisements Delivered Via a Printer Device";

Gross, U.S. Patent Application Publication No. US 2010/0005486 A1, published Jan. 7, 2010, entitled "Apparatus and Method for Embedding Commercials";

Evevsky, U.S. Patent Application Publication No. US 2009/0313060 A1, published Dec. 17, 2009, entitled "System and Method for Personalized Printing and Facilitated Delivery of Personalized Campaign Items";

Chow et al., U.S. Patent Application Publication No. US 2009/0157650 A1, published Jun. 18, 2009, entitled "Outbound Content Filtering Via Automated Inference Detection";

Chow et al., U.S. Patent Application Publication No. US 2009/0150365 A1, published Jun. 11, 2009, entitled "Inbound Content Filtering Via Automated Inference Detection";

Gnanasambandam, U.S. patent application Ser. No. 12/761,985, filed Apr. 16, 2010, entitled "System and Method for Providing Feedback for Targeted Communications";

Liu, U.S. patent application Ser. No. 12/603,999, filed Oct. 22, 2009, entitled "System and Method for Handling Print Requests from a Mobile Device";

Liu et al., U.S. patent application Ser. No. 12/540,051; filed Aug. 13, 2009, entitled "System and Method for Communicating with a Network of Printers Using a Mobile Device";

Harrington, U.S. patent application Ser. No. 12/533,901, filed Jul. 31, 2009, entitled "Method and System for Constructing a Document Redundancy Graph";

Gnanasambandam et al., U.S. patent application Ser. No. 12/486,951, filed Jun. 18, 2009, entitled "System and Method for Policy-driven File Segmentation and Intercloud File Storage and Retrieval";

Partridge et al., U.S. patent application Ser. No. 12/480,558, filed Jun. 8, 2009, entitled "Method and System for Printing Documents from a Portable Device";

Gnanasambandam et al., U.S. patent application Ser. No. 12/424,858, filed Apr. 16, 2009, entitled "System and Method for Selectively Controlling the Use of Functionality in One or More Multifunction Devices and Subsidizing Their Use Through Advertisements";

Gnanasambandam et al., U.S. patent application Ser. No. 12/424,820, filed Apr. 16, 2009, entitled "Method and System for Providing Contract-free 'pay-as-you-go' Options for Utilization of Multi-function Devices";

St. Jacques, Jr. et al., U.S. patent application Ser. No. 12/335,048, filed Dec. 15, 2008, entitled "Method and System for Automatically Providing for Multi-point Document Storing, Access, and Retrieval";

Edelman, B. and M. Schwarz "Optimal Auction Design and Equilibrium Selection in Sponsored Search Auctions," *American Economic Review*, Vol. 100 (2), 7 pages, copyright 2010;

Edelman, B., Ostrovsky, M., and Schwarz, M., "Internet Advertising and the Generalized Second-Price Auction: Selling Billions of Dollars Worth of Keywords," *American Economic Review*, American Economic Association, Vol. 97(1), pages 242-259, March 2007;

Google AdWords Select, 2002 https://www.google.co/accounts/ServiceLogin?service=adwords&hl;

Myerson, R. B. "Optimal Auction Design," Mathematics of Operations Research, 6(1), pages 58-73, 1981;

Shazam Entertainment Ltd., 2002, http://www.shazam.com/music/web/pages/backckground.html;

Talluri, K. and van Ryzin, G., "*The Theory and Practice of Revenue Management*," Publisher Springer, $1^{st}$ Edition, Feb. 23, 2005;

Ulku, L., "Optimal Combinatorial Mechanism Design," Unpublished Manuscript, Rutgers University, 2006;

Walsh, T., "Search on High Degree Graphs," In *Proceedings of IJCAI*-2001, pages 266-271, 2001.

BRIEF DESCRIPTION

In one embodiment of this disclosure, described is a method of providing user requested printed material and one or more targeted communications to a user of a printing system, the method comprising: a) the printing system acquiring material to be printed on a printing device to produce the user requested printed material, the printing device associated with the printing system; b) the printing system acquiring the one or more target communications associated with the user requested printed material; and c) the printing system printing the user requested printed material utilizing the printing device and providing the acquired one or more targeted communications to the user, wherein the one or more targeted communications are associated with one or more bids of an auction, the auction configured to accept a plurality of bids from a plurality of respective bidders, each bidder biding on providing a respective targeted communication to the user.

In another embodiment of this disclosure, described is a method of providing user requested printed material and one or more targeted communications to a user of a printing system, the printing system comprising a printing device and an Ad (advertisement) Aggregator Server operatively connected to the printing device, and a print server operatively connected to the Ad Aggregator Server and the printing device, the method comprising a) the printing device acquiring material to be printed on the printing device to produce the user requested printed material; b) the printing device acquiring one or more targeted communications from the Ad Aggregator Server, the one or more targeted communications associated with the printed material; and c) the printing device printing the user requested printed material and one of the printing device and the print server providing the acquired one or more targeted communications to the user, wherein the one or more targeted communications are associated with bids of an auction, the auction configured to accept a plurality of bids from a plurality of respective bidders, each bidder bidding on providing a respective targeted communication to the user.

DETAILED DESCRIPTION

Figure 1:
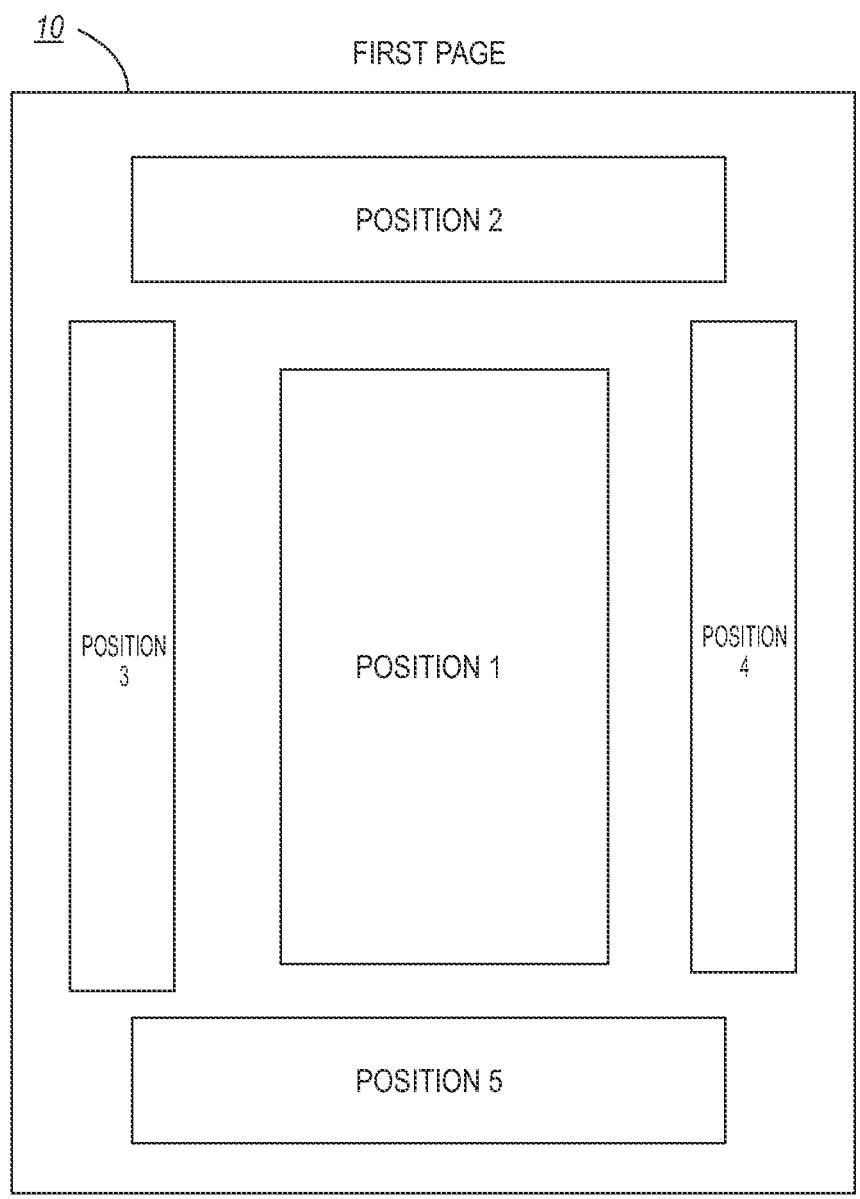
FIGS. 1 and 2 show one example of placement/location rankings based on response rates for paper real-estate, according to an exemplary embodiment of this disclosure.
Figure 2:
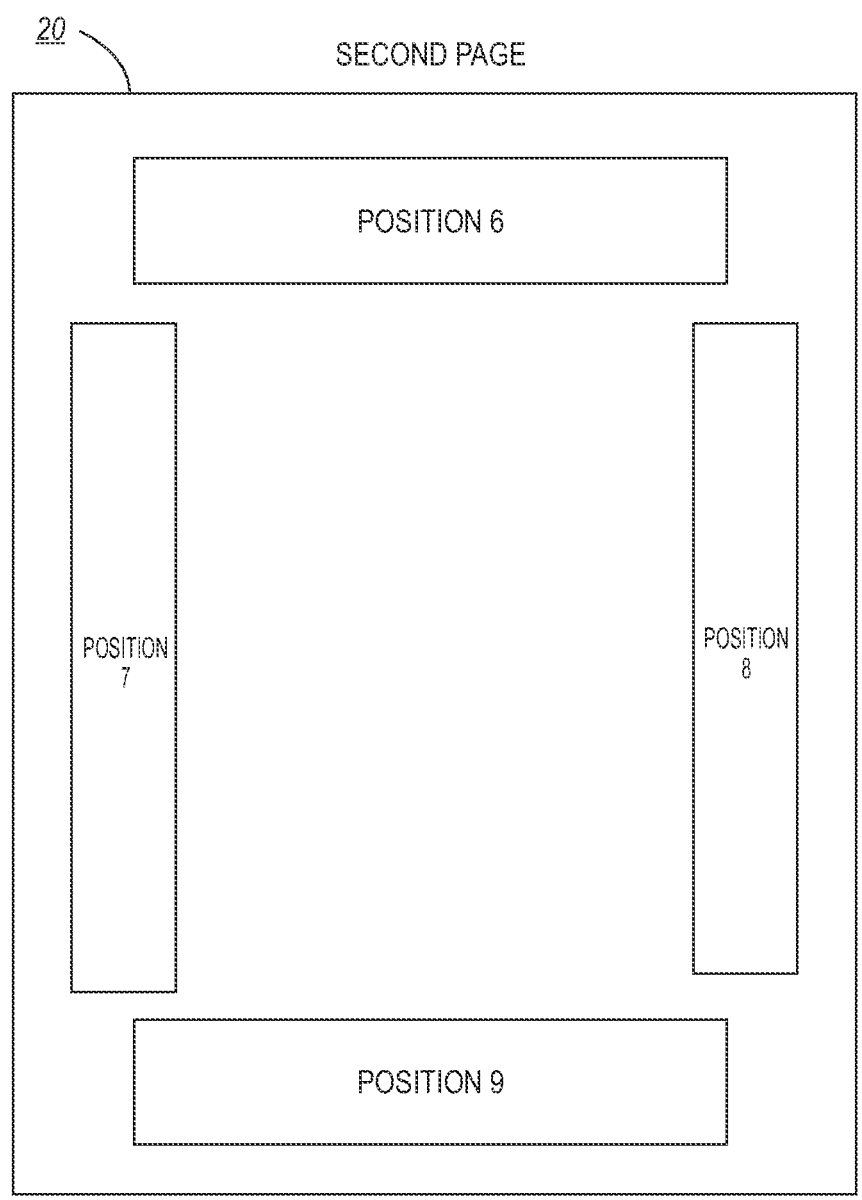

At the onset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "advertiser" means any individual, agency, organization, facility, corporation, or other entity which desires to communicate some message to consumers, with the message commonly, but not necessarily, regarding the goods, services or other activities offered by the advertiser. "Consumers" means any individual or entity which desires to receive the advertiser's communications, or which the advertisers desire to target for delivery of the communications. The terms "message", "communication", and "advertisement" are intended to be synonymous and broadly defined, including, for example, a print or electronic advertisement, a personalized message, an information feed, a sales alert, a coupon, an event listing, directions, a map, etc. Although the detailed description is directed primarily to aspects related to advertising and advertisement communications, one of ordinary skill in the art will appreciate that a variety of other modes of communication also fall within the spirit and scope of the claims. The message or communication may take the form of a printed document, a visual display and/or an audio signal. As used herein, "aggregator" is the system, individual, agency, organization, and/or entity which provides, operates, or controls the means by which the advertisers can communicate with the consumers. Thus, "aggregator" is intended to broadly include all of the software and computer hardware which is used to automate certain functionality or steps, or to transmit, compare, analyze, or receive data, particularly in response to consumer or advertiser input. For example, the aggregator may be owned or run in collaboration with an online advertisement aggregator such as Yahoo or Google. By "computer," "PC" "computing device," or "computer hardware" it is generally meant any analog or digital electronic device which includes a processor, memory, and/or a storage medium, including peripherals such as monitors, mice, keyboards, etc., for operating or executing software. "Optimizer" means the system, individual, agency, organization, and/or entity which analyses data to create optimized prices for various advertisement products, which advertisement products are then offered to advertisers by the aggregator. Thus, "optimizer" is intended to broadly include all of the software and computer hardware which is used to automate certain functionality, or to transmit, compare, analyze, or receive data, particularly in response to consumer or advertiser input. However, it should be understood that terms such as 'optimal,' 'optimize,' etc. shall be interpreted broadly to refer to a price or other result that is better, given a set of desired conditions, than other results that would be reasonably obtainable under similar conditions and reasonable, practical user demands. The term "optimize" and "optimal" should not be construed to require a mathematically provable optimal result or solution. Thus, while the optimizer aims to find the best solution, if possible, this may not always be a realistically achievable goal and is accordingly not required by the methods described herein. An "advertising product" as used herein, refers to one of the various individual advertisement services which may be provided by the aggregator (e.g., advertisement campaign options which an advertiser can purchase from an aggregator). As described further herein, each advertisement product is determined by evaluating not only the size and/or number of impressions of the advertisement, as in traditional advertising, but also the goods or services, related to the advertisement, the consumer receiving the advertisement, or any other parameters which enable the aggregator to more accurately target relevant consumers for the advertisers. In some embodiments the optimizer and the aggregator are the same entity.

"Multi-function device" and "MFD" as used herein is intended to mean a device which includes a plurality of different imaging devices, including but not limited to, a printer, digital copier, facsimile machine and/or a scanner, and may further provide a connection to a local area network, a wide area network, an Ethernet based network or the internet, either via a wired connection or a wireless connection. An MFD can further refer to any hardware that combines several functions in one unit. For example, MFDs may include but are not limited to a standalone printer, one or more personal computers, a standalone scanner, a mobile phone, an MP3 player, audio electronics, video electronics, GPS systems, televisions or display monitors, recording and/or reproducing media or any other type of consumer or non-consumer analog and/or digital electronics. By "fleet" it is meant a collection of MFDs which are preferably in communication with each other, such as through a network or the Internet. "User" is generally interchangeable with "consumer", particularly when the consumer is using an MFD.

Furthermore, as used herein, "click through" is intended to mean feedback. Moreover, "print click through" or "PCT" is intended to mean a single feedback transmission, emanating from a printer/MFD or printer/MFD driver, that is provided to the advertiser or advertising aggregator. Thus, "print click through" is defined as a form of verification provided by the printer/MFD to the advertisers and there are several levels of verification provided depending on the multitude of actions performed by the user or device. Similarly, device-click through (DCT) is an analogous form of verification that is necessary to provide value added services to interested parties, e.g., content providers, thereby encouraging the interested parties to continue utilizing the variety of communications forms (e.g., printed documents, electronic displays, etc.). For example, when the user retrieves an advertisement, the user may immediately place a mark, glyph, or symbol, on the paper and scan, fax, or hand it back to an MFD, an advertiser, or a store affiliated with an advertiser. The click-through process may then provide some functionality to incentivize the scanning/faxing/hand-over process, such as a discount on the advertiser's goods or services. If the advertisement is a banner on a webpage, the MFD notes the position of the mark and then emails the original advertisement and more relevant ads based on the expressed preference through the marking on the advertisement (e.g., the MFD determined which of a number of check boxes are marked, and performs an option corresponding to that checkbox). Regardless of whether or not an incentive is provided, the MFD sends information that a mark was placed on a certain ad and forwards this information to the advertiser and/or aggregator as a "click through". In some aspects, an email can also be sent to the user which contains a link that can be clicked, thereby further connecting the advertisers and the users. Other examples of print and device click through are described in the incorporated references.

Although any methods, devices or materials similar or equivalent to those described herein can be used in the practice or testing of these embodiments, some embodiments of methods, devices, and materials are now described.

According to the definitions above, the presently described embodiments provide methods to optimize prices for targeted communications, i.e. advertisement products related to on-demand electronic, online, or print marketing campaigns. An on-demand campaign can be designed, administered, tracked, and improved from a central location or a distributed node (e.g., the aggregator), that is in data communication with a fleet or collection of multi-function devices (e.g., kiosks, computer terminals, display devices, etc.). Non-standard click-through indicators (see the incorporated references) such as presence, inquiries, visits, time-spent at store, etc., can be tracked via DCT.

According to one aspect of this disclosure, provided is an optimal auction mechanism design for on-demand print communication including, but not limited to, ads, banners, images and information nuggets for office, kiosk, and production environments. Print communications can accompany traditional documents (e.g. inserts) or on the printed part of the document (e.g. inserts). Moreover, the printed communications could be contextual to the background for the communication derived from the material being printed (e.g. credit card statements) or the communication could be targeted and personalized with out-of-band information with the communication being the main and only message (e.g. automobile marketing campaigns). This disclosure ranks placement/location on the print real-estate, based on the probability of each viewer responding (i.e. response rate) to an advertisement, i.e. when the advertisement is placed in the placement/location. The advertisements are arranged on the ranked placement/location in descending order of bids. According to one aspect of the disclosure, the embodiments include applying the generalized second-price auctions to the on-demand print communication, and making the auction mechanism optimal by setting optimal reserve price.

In the online advertisement domain, the sponsored search auctions started in 1997 and adopted generalized first-price auction mechanism. However, the mechanism was determined to be unstable due to the dynamic nature of the environment. To overcome the inefficiency in the generalized first-price auction, a pay-per-click system, AdWords Select, was introduced in 2002, which uses the generalized second price auction mechanism. Therefore, there has been a very rapid evolution of auction mechanism design in the online advertisement domain. For more detailed history of sponsored search auctions, see Edelman, B, Ostrovsky, M., and Schwarz, M., *Internet Advertising and the Generalized Second Price Auction: Selling Billions of Dollars Worth of Keywords*.

As discussed in the background section, in the print-based advertisement domain, there is not much clarity about what benefits advertisers get for printed ads because paper does not have a click-through mechanism as in the online domains, resulting in a difficult medium to monitor. Therefore, prices charged to an advertiser are based primarily on impressions and sizes. Often, lengthy and time-consuming processes such as cashing-in a coupon, returned mail, etc. are used to determine if a message has actually been viewed by a user. This situation has resulted in fixed prices for print-based advertisements for a given size of message.

Presently, there has been no attempt to apply online/real-time auction mechanisms to the print-based advertisement domain.

In this disclosure, provided is an optimal auction mechanism design for on-demand print communication including ads, banners, images and information nuggets, for office, kiosk, and production environments. Consequently, a new marketplace can be generated adopting auction mechanism to advertisers in the print-based advertisement domain.

Notably, in present sponsored search auctions, links to advertisers can be arranged in descending order of bids. The link of the highest bidder is placed on the top in the sponsored search area. It is well known that the average click-through rate (CTR) tends to be a decreasing function of positions, which gives a feeling of fairness to advertisers when their links are arranged in descending order of bids. According to one aspect of this disclosure, ranking of placement/location on the print real-estate is based on the probability of a viewer responding to an advertisement when the advertisement is placed in the respective placement/location. The placement/location receiving the highest rank corresponds to the top position in the sponsored search auctions. Therefore, advertisements are arranged on the ranked placement/location in descending order of bids.

In this disclosure investigated are methods provided for applying the generalized second-price auctions to on-demand print communication, which is widely used for presently known sponsored search auctions. In addition, a method of making the auction mechanism optimal by setting an optimal reserve price is provided.

Notably, a method of generating on-demand personalized print communications was disclosed in Gnanasambandam et al., U.S. Patent Application Publication No. US 2010/0088178 A1, published Apr. 8, 2010, entitled "System and Method for Generating and Verifying Targeted Advertisements Delivered Via a Printer Device", Gnanasambandam et al., U.S. patent application Ser. No. 12/424,858, filed Apr. 16, 2009, entitled "System and Method for Selectively Controlling the Use of Functionality in One or More Multifunction Devices and Subsidizing Their Use Through Advertisements", and Gnanasambandam et al., U.S. patent application Ser. No. 12/424,820, filed Apr. 16, 2009, entitled "Method and System for Providing Contract-free 'pay-as-you-go' Options for Utilization of Multi-function Devices". After a user requests a printing transaction, keywords are generated based on titles of the requested document and user-chosen subject categories. In addition, relevant history and stored content from an associated database are used for the keyword generation process. For security purposes, sensitive information can be avoided and not selected for monetization. Along with keywords/hypernyms generated in the process, time, location, and user information can be sent together to advertisers or advertisement aggregators. Advertisements related to identified keywords, time, and location are then selected and sent to the print device and are printed along with the requested printed transactions such as printed receipts, printed documents at work/home, credit card statements, etc., in an office, kiosk or production printing environment.

In addition, a method of giving feedback effectively to advertisers about their advertisements was disclosed in Gnanasambandam, U.S. patent application Ser. No. 12/761, 985, filed Apr. 16, 2010, entitled "System and Method for Providing Feedback for Targeted Communications". This method of providing feedback is called device click-through (DCT) which is an alternative to charge-per-click (CPC), a term of importance in search/keyword advertisements online. Several levels of DCT can be constructed depending on click-through speed, security level, the existence of user actions involved in promotional material and localization guarantees for the user and the device.

Described herein is an optimal auction mechanism design for on-demand print communication including ads, banners, images and information nuggets, for office, kiosk, and production environments. The following exemplary embodiments are relevant to on-demand print communications.

Information Goods Associated with the On-Demand Print Communication

In the on-line sponsored search auction, keywords are sold, and bidders bid for keywords. The highest bidder will have the most prominent position in the sponsored search area. Each keyword is a different advertisement product to sell, which is reasonable because bidders have different valuation for each keyword. For example, keywords in the shoes category may be more valuable than keywords in the book category due to the higher margin in the shoes product. Therefore, advertisers are willing to bid more for keywords in the shoes category than those in the book category.

However, the on-demand print communication enables more diversified products to be sold, including, but not limited to, at least five factors:
1. the level of DCT,
2. keyword/hypernym/category of topic,
3. time group,
4. physical location group,
5. demographic group, and
6. real-estate group.

Advertisers will potentially have different valuations for each category of this composite information good which includes meta-data about the printed communication. The level of DCT refers to a combination of actions or other information that can be collected from or near the printed artifact. See Gnanasambandam, U.S. patent application Ser. No. 12/761,985, filed Apr. 16, 2010, entitled "System and Method for Providing Feedback for Targeted Communications". For example, advertisers may place higher values on the higher level of DCT because of a variety of detailed pieces of information that are delivered fast. Also, meta-data such as time, location, demographics, prior-history of printed advertisements cashed in, such as coupons used, categories etc. may all have financial value if quickly delivered to the advertiser through a closed loop system.

Levels of Information Goods

Based on the assumption that advertisers have different valuations for advertisements, constructed are levels of information goods as the communication products for on-demand printing. The six groups provided here, from which levels of information goods considered includes:

(a) the levels of device click-through (DCT) as defined in Gnanasambandam, U.S. patent application Ser. No. 12/761, 985, filed Apr. 16, 2010, entitled "System and Method for Providing Feedback for Targeted Communications";

(b) a group comprising of keyword/hypernyms or categories, for example, shoes, toys, books, etc.;

(c) time quantified as morning, noon, afternoon, etc.;

(d) a location group such as NY, CA, Metropolitan area, rural area;

(e) a demographic group such as Female 25-35, anyone 25-50 etc.; and (f) real estate group (paper print, web, mobile phone, etc).

Note: other groups can be added.

An Example of Products Based on Levels of Information Goods

For example, the following two different advertisement products can be constructed for an on-demand personalized printing request. Each product is one item chosen from the above attributes (in the same order they are listed above).

Product 1=(Level 1 PCT, shoes, morning, NY, Female 25-35, paper) and

Product 2=(Level 3 PCT, food, lunch, NY, anyone 25-50, mobile phone), etc.

Within this environment, provided now is a method of applying an auction mechanism for each category of the composite information good.

Method of Ranking Advertisement Placement/Location in the On-Demand Print-Based Communication.

In the sponsored search auctions previously described, the links to advertisers are arranged in descending order of bids. The link of the highest bidder is placed on the top (position 1) in the sponsored search area. It is well known that the average click-through rate (CTR) tends to be a decreasing function of position and the links are arranged in descending order of bids.

For a print-based communication, advertisement placement/location visibilities can be intuitively characterized as follows:

An advertisement placed on top may be more visible than an advertisement placed on the left margin of paper real-estate. Also, an advertisement placed on paper real-estate may be more visible than the one shown in a transient way on the user interface.

Needed is a method to measure the level of visibility to determine which place/location is more prominent. One way of measuring this is to define the probability that a user reads and responds to the advertisement, i.e. response rate, on each placement/location. The probability may be determined by market survey or other proper way. For effective market research, it is possible to use an Amazon web service called Mechanical Turk, which pays people to do human computation tasks. Workers are paid when they finish Human Intelligence Tasks (HIT) successfully. Some exemplary HITs can be created as described below.

Example 1

Place different images in all advertisement placement/locations for some designated time, and remove images. Then, ask a person to name the corresponding image for a specified placement. Then the response rate for the placement can be estimated as the number of correct answers divided by the total number of experiments.

Example 2

Place clickable buttons in all advertisement placement/locations and ask a person to click the buttons, informing the person that they do not have to click all the buttons. Then the response rate for a specific placement can be estimated as the number of clicks occurred in the placement divided by the total number of experiments.

The estimated response rates provided by market research prior to the auction practice can be further adjusted as the auction is operated to collect the device click through (DCT) rate data for each placement/location.

For each information good, defined are the following:

φ is the probability of reading or responding to the advertisement which is surveyed for each placement/location. This is defined as the response rate.

$\phi_{(i)}$ is the i-th largest response rate φ and the corresponding placement/location named is position i.

With reference to FIG. 1, one exemplary illustration of ranking position for paper real-estate is depicted based on the response rates, φ. It is to be understood for purposes of illustration, the use of paper real-estate is being illustrated and described. However, it is to be understood that "ranking position" can also be applied to web page real-estate, mobile phone display real-estate, etc. Position 1 is associated with response rate $\phi_1$ and position 2 is associated with response rate $\phi_2$, and so on.

Generalized Second-Priced Auctions

According to one exemplary embodiment of this disclosure, a generalized second-price auction, which was first adopted by Google and later also adopted by Yahoo!, is applied as an auction mechanism. General second-price auction mechanisms recognize that a bidder in position i will never want to pay more than one bid increment above the bid of an advertiser in position i+1. Therefore, an advertiser in position i pays a price per click equal to the bid of an advertiser in position i+1 plus a minimum increment which is typically $0.01 according to B. Edelman, M. Ostrovsky and M. Schwarz, M., Internet Advertising and the Generalized Second Price Auction: Selling Billions of Dollars Worth of Keywords, American Economics Review.

Similarly, the generalized second-price auction can be applied to the ranked positions as defined above. Therefore, an advertiser in position i pays a price equal to the bid of an advertiser in position (i+1) plus a minimum increment. For analysis and discussion purposes, the minimum increment is neglected. However, it is to be understood that the minimum increment can be added when the auction is executed.

Model Description

For each information good, it is assumed that the valuation of the bidders is private and has an independent identical known distribution.

DEFINITION

N: total number of bidders
v: the valueation of the information good to an advertiser
$v_{(i)}$: the i-th largest value of v among N bidders
F(.): the distribution function of the valuation v
f(.): the probability distribution function of the valuation v
$\phi_{(i)}v$: the valuation of the information good to an advertiser when placed in the position i
Q: the capacity of placement/position (so there are position 1, position 2, ..., position Q)
α: the revenue share with ad aggregator ($0 \leq \alpha \leq 1$)
c: the unit cost of printing, scanning, faxing, etc for one advertisement when a user response to the advertisement. For example, if the user prints a coupon of interest, then the cost includes the printing cost of the coupon.
π: the expected profit of the generalized second-price auction
v*: the reserve price
π*: the optimal expected profit of the generalized second-price auction
β: the profit share with the fleet operator The distribution function of v is assumed to be regular to develop the optimal auction mechanism. The same regularity assumption is found in Edelman, B. and Schwarz, M, Optimal Auction Design in a Multi-unit Environment: The Case of Sponsored Search Auctions; Myerson, R. Optimal Auction Design, Mathematics of Operations Research 6, 58-73, 1981; Talluri, K and van Ryzin, G., The Theory and Practice of Revenue Management, Springer, USA, 2005; and Ulku, L. Optimal Combinatorial Mechanism Design, Rutgers University, 2006, when the optimal auction mechanism is developed.

Assumption (Regularity Condition)
1−F(v)/f(v) is a decreasing function of v.

Figure 3:
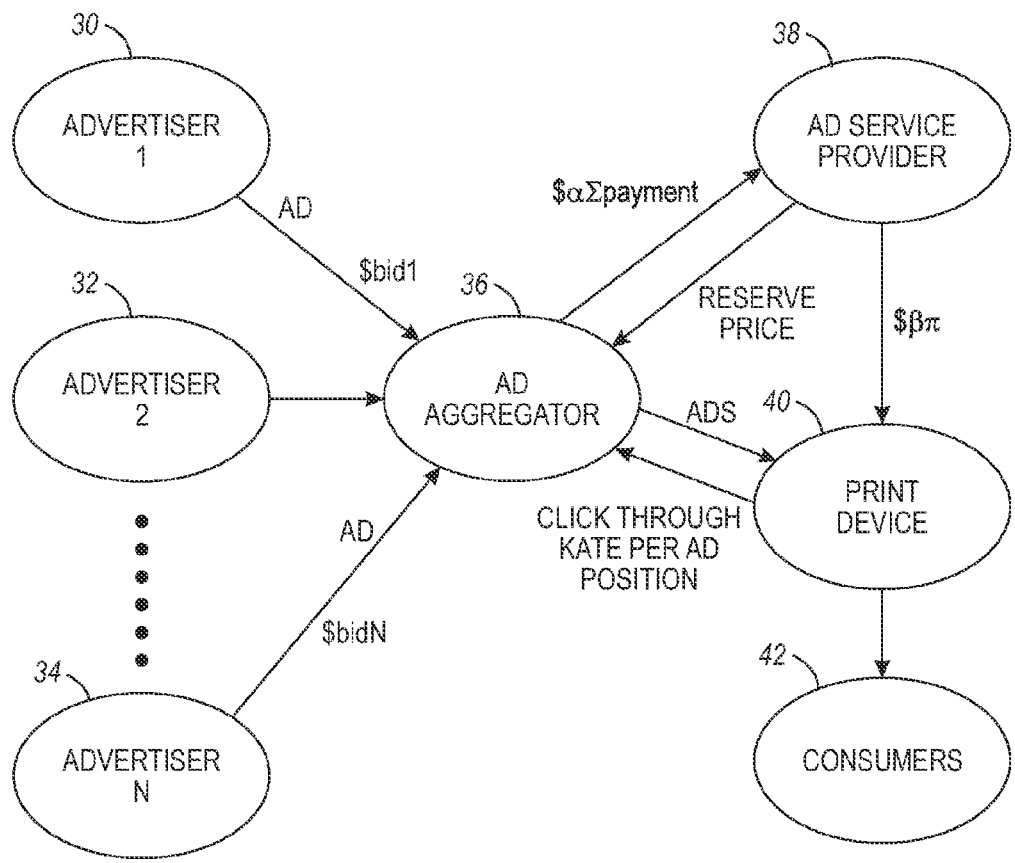
FIG. 3 shows an exemplary embodiment of a financial transaction for an information product as it is auctioned.

With reference to FIG. 3 illustrated is one exemplary system using an auction mechanism as disclosed herein. As shown in FIG. 3, the environment includes Ad Service Provider 38, Ad aggregator 36, advertisers 30, 32 and 34, Printing Device 4, and consumers 42. Traditionally, the aggregator collects advertising material from advertisers and distributes it to consumers such as through an MFD fleet/printing device in exchange for payment from the advertisers. In the shown embodiment, any number of advertisers may be associated with the Ad aggregator 36. As defined above, the MFDs are any electronic device that enables at least some interaction between a consumer and an advertiser for transmission of an advertisement or communication to consumers (e.g., computer, cell phone, television, monitor, printer, speaker, etc.). According to the embodiment of FIG. 3, before collecting advertisements from the advertisers, the aggregator 36 receives a list of prices for advertisement products.

The environment is arranged to provide consumers with on-demand and personalized advertisements for products, services, etc. The aggregator 36 is used to facilitate the collection of advertisements from advertisers and the on-demand delivery of advertisements to the consumers. By "on-demand" and "personalized" it is meant that the delivery of the advertisements is based on or related to an input or action of the consumer, typically in real-time, such as input a computer, laptop, cell phone or other MFD. It should be appreciated that the action performed by the consumer could be explicitly requested by the consumer, such as purposefully performing a keyword search, clicking a link, etc. or it could be implicitly determined or interpreted by the optimizer, such as from the past history of the consumer, for example, the time of day, geographical location, text or metadata associated with a document or electronic file retrieved, scanned, accessed, opened, or shared by the consumer, etc. Thus, it is generally meant that "explicitly requested" means that it is the consumers desire and intent to receive advertisements, while "implicitly requested" means that the optimizer or aggregator determines from the actions, history, documents, files, and any other known information of the consumer that certain advertisements would probably be of interest to the consumer. An explicit request, for example, may include the consumer performing a search for shoes, such as by using a computer to type the word "shoes" into a search box for a search engine on the internet, and in addition to search results, advertisements related to shoes could be directed to the consumer 42 from the aggregator 36. An implicit request, for example, may include the consumer requesting to print a document having the word "shoes" in the title, metadata, or body of the document, and the aggregator could scan the document to identify word "shoes" and accordingly print an advertisement for shoes along with the document.

As depicted in FIG. 3, Ad service provider 38 has an agreement with Ad aggregator 36 to receive advertisements from multiple advertisers 30, 32 and 34. In addition, Ad service provider 38 has an ability to set the reserve price (=v*) for each information product, so no advertisements are accepted from an advertiser if a price is less than the reserve price. Based on a contract, Ad service provider 38 may keep the total payment of bidders whose advertisements are delivered to a fleet of MFDs multiplied by α (0≤α≤1). Alternatively, Ad service provider 38 is the Ad aggregator 36, then α=1, and Ad service provider 38 retains all advertisement revenue.

According to one exemplary embodiment, Ad service provider 38 does not charge the print device operator the advertisement related cost (=c) per advertisement in response to the advertisement of interest (i.e., printing a coupon of interest), and bears the cost itself. Also, Ad service provider 38 may grant the advertisement profit multiplied by β (0≤β≤1) to the print device operator to subsidize the cost of operation.

If Ad service provider 38 is the Ad aggregator 36, or if the third-party Ad aggregator 36 agrees to share all the bidding information with Ad service provider 38, then Ad service provider 38 acquires knowledge about the bid distribution leading to additional knowledge about the distribution of bidders. In this case, Ad service provider can use the following proposition to calculate an optimal reserve price for a GSP auction.

Optimal Reserve Priced Proposition

The optimal reserve price for a generalized second price (GSP) auction is v* that solves $$\alpha J(v^*) = c, \text{ and } J(v) = v - \frac{1 - F(v)}{f(v)}$$

Proof

The proof of the proposition follows similar steps taken by Edelman, B. and Schwarz, M., "Optimal Auction Design in a Multi-unit Environment: The Case of Sponsored Search Auctions." The optimal mechanism is an incentive-compatible mechanism that allocates objects so that the sum of the virtual values of all bidders is maximized. See Ulku, L. Optimal Combinatorial Mechanism Design, Rutgers University, 2006, which is a generalization of Myerson, R. Optimal Auction Design. Mathematics of Operations Research 6, 58-73, 1981. For purposes of this disclosure, the virtual value of an advertiser located in position i is $\phi_{(i)} J(v)$.

Unlike the sponsored search auction, this term should be modified by multiplying α and subtracting $\phi_{(i)} c$, because the revenue received from the advertisement aggregator is α multiplied by the payment of an advertiser (by the revenue-share contract), and there will be a cost, c, for each advertisement for each click through. Therefore, the objective is to maximize the following sum:

$$\sum_{i=1}^{min(N,Q)} \phi_{(i)}(\alpha J(v) - c).$$

From the above sum, the optimal mechanism never allocate advertisement positions to an advertiser whose value of αJ(v) is less than c, giving a negative contribution to the total sum. Therefore, the reserve price v* is a solution for $$\alpha J(v^*) = c.$$

The optimal strategy is to assign advertisement position to all the advertisers whose value is not less than v* when there is capacity, since J(v) is increasing in v as the regularity condition is assumed. In addition, it is optimal to assign ad positions in the descending order of bids since the J(v) is an increasing function of v. The analysis of equilibrium of GSP follows from the proof of Theorem 2 of Idelman et al. "Internet Advertising and the Generalized Second Price Auction: Selling Billions of Dollars Worth of Keywords," American Economics Review.

Steps in Deriving Optimal Prices

According to one exemplary embodiment of this disclosure, the following steps are completed to derive optimal prices for each advertisement product.

1. Offline steps (Steps done as often as possible to have the most updated information)
   1.1. For all advertisement products, estimate the ordered response rates ($\phi_{(1)} \phi_{(2)} \phi_{(3)} \phi_{(4)}, \ldots$)
   1.2. For all advertisement products, estimate the optimal reserve price v*.
   1.3. Announce to advertisement aggregators the list of advertisement products and the corresponding reserve prices.
   1.4. Advertisement aggregators collect advertisements from advertisers whose bids are greater or equal to the reserve price and save them in their advertisement database.
2. Real-time steps
   2.1. Receive print request asking for advertisement of products
   2.2. Advertisement aggregators send advertisements with bids in their advertisement database to the print device.
   2.3. The print device prints out the advertisement placing the advertisements in advertisement places in descending order of their bids.
   2.4. Users respond to all the advertisements of interest, resulting in the click though rates.
   2.5. Advertisement aggregators receive click through rate information for all the advertisements delivered and collect the money from advertisers based on the click though rates and pay the Ad service provider the advertisement revenue multiplied by α.
   2.6. The Ad service provider credits the print device or device owner the advertisement profit (advertisement revenue received from advertisement aggregators minus all the costs incurred in advertisements) multiplied by β per transaction.
   2.7. The accumulated credits are dispersed to the device owner in one of many ways (e.g., cash, check every month, in kind, combinations thereof).

Figure 4:
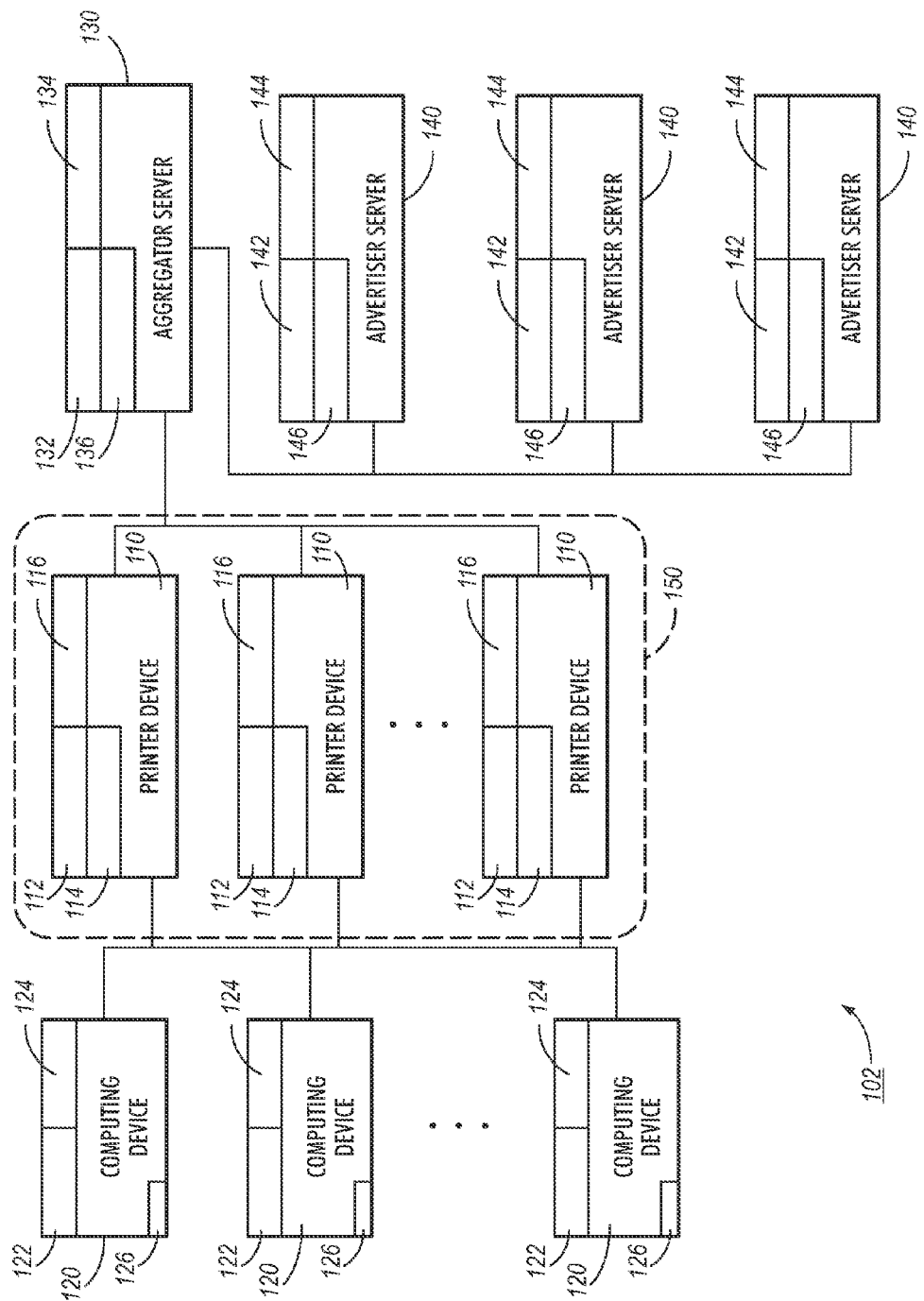
FIG. 4 is a block diagram of an exemplary system for providing user requested printed material and for monetizing information in a printing environment according to this disclosure.

With reference to FIG. 4, a system for monetizing information in a printing environment is shown and designated generally by reference numeral 102. Monetizing information includes using the information to generate targeted advertisements (ads) and/or verifying that a predetermined action was performed using the generated ad(s). The system 102 includes at least one printer device 110 in data communication with at least one computing device 120. The at least one printer device 110 is in data communication with an aggregator server 130, which is in data communication with at least one advertiser server 140.

The at least one printer device 110 receives a print job request from the at least one computing device 120 and retrieves target information including context and/or content data. The print job request includes a request to print data, and the data which is requested to be printed. The request includes information, such as where (e.g., which printer device 110 should print the data), when to print the data, and how to print the data (e.g., how many copies, paper size to be printed on, paper orientation, etc.). The content data includes information included in the data to be printed, which may include, for example, textual and/or graphical information, and may also include the structure, design and/or layout of the information. The context data includes information related at least to a user that sent a job request, the job request itself, and/or job requests previously sent to the printer device 110 handling the job request and/or one of the other printer devices 110.

The at least one printer device 110 sends the retrieved target information to the aggregator server 130. The aggregator server 130 has previously set up accounts with at least one advertiser, including receiving ad generation criteria from an advertiser server 140 associated with the respective advertiser. The aggregator server 130 compares the target information to stored ad generation criteria. When a match is found between the target information and ad generation criteria, the aggregator server 130 generates an ad which it delivers to the source of the print job request on behalf of each advertiser associated with the matching ad generation criteria.

The ad includes any data desired by the advertiser to be conveyed to one or more users (e.g., one or more persons using the at least one printer device 110 or computing device 110 in communication with the at least one printer device 110). This may include, for example, text, graphics, a link (e.g., a URL or telephone number) which can be used by the user(s) to access additional data desired by the advertiser to be conveyed to the user(s). The source of the print job request includes the at least one printer device 110 which received the print request. The advertiser may be any entity conveying data to the user(s), e.g., an external entity, such as a commercial entity advertising a good or service to the user(s). As described below, the advertiser may pay a fee, such as to the aggregator or the owner/lessee of the printer devices 110 for the right to advertise to the user(s). It is envisioned that the printer devices 110 and the advertiser are all controlled by a single entity, and that the ads convey internal or company messages which may be proprietary. Further, the advertiser may not be required to pay a fee for the generation and/or delivery of the ads.

Alternatively, the aggregator server 130 selects one or more advertiser servers 140 and notifies the selected advertiser servers 140 of a targeted ad opportunity. The selected advertiser servers 140 may generate the targeted ads which are to be delivered to the user. The selected advertiser servers 140 may deliver the generated ads directly to the user or to the user via the aggregated server 130. In the current example, the advertiser servers 140 do not have direct access to the user in order to preserve anonymity of the user with respect to the advertiser, and the aggregator server 130 delivers the ads to the user. Examples of targeted ads which an advertiser generates which meet context conditions such as place, time and user history include a printout at lunch time of a pizza coupon for a local restaurant, and an ad for a deal on tires at the nearest auto club.

The predetermined verification action verifies delivery or receipt of the ad and provides feedback to the advertiser. The predetermined verification action may be performed by the printer devices 110, and/or a user of the printer or one of the computing devices 120. The nature and type of action that qualifies as a predetermined verification action may be established by the contracts executed between the aggregator which owns and operates the aggregator server 130, the owners of the respective printer assemblies 150 and the respective advertisers which own (which may include operating or administering) the advertiser servers 130.

A user verifies receipt and/or use of the verifiable ad(s), such as by using a URL provided by the aggregator server 130 to the printer device 110; sending a data communication to the aggregator server, such as faxing or emailing a response verifying receipt of the ad; or redeeming a coupon ad. The URL is used, for example, by activating a hyperlink ad (such as by using a user interface (UI) pointing device, such as mouse, to click on the printer-provided hyperlink). The faxed or emailed response may include a scanned in version of the ad stamped such as with a glyph to validate it. In another example, the printer device 110 verifies output and delivery of the ad by printing the ad and sending notification of the printing action to the aggregator server 130. The notification by the printer device 110 may be, for example, a data communication sent via its communication interface to the aggregator server 130 identifying an ad and stating that it was printed. The notification may further include information such as the time of the printing and an identity of the printer device 110 that performed the printing. Since the printer device 110 may store the ad and provide the ad or the URL to the user's computing device 120, the user can perform a verification action from the printer device 110 or from a computing device 120. Notification of the verification action is provided to the appropriate advertiser server(s) 140 via the aggregator server 130, or alternatively directly by the user.

An accounting is kept of the verified ads. The respective advertisers are charged for each is of its verified ads. Advertisers which do not require verification may be charged at a different rate. The owner of the printer assembly 150 is compensated for each verified ad resulting from target information that it provided. Additionally, an account associated with the aggregator may also be compensated for each verified ad. The amount charged to advertiser and the amount credited to the owners of the printer assembly 150 may depend on the type of verification action that was performed. For example, a verification activity including a user response, such as sending a response to the aggregator server 130 or activating a URL, may carry a higher level of user-perceived importance than simply viewing an online ad or a printed ad, and therefore may incur higher charges to the advertiser and/or larger amounts credited to the owner of the printer assembly 150.

It is envisioned that the advertiser and the owner/lessee are a single entity that pays a fee to the aggregator server 130 for the service provided. The fee may be proportional, for example, to the number of ads delivered. Verification of receipt or use of the ads may or may not be required, and may or may not be used for determining the fees.

In another scenario, it is also envisioned that the advertiser provides a service to the owner/lessee of the printer devices 110 and/or to the users by provided desired information to the users. The owner/lessee of the printer devices 110 may be charged a fee and/or the advertiser may be credited when an ad is delivered to a user. Verification of receipt or use of the ads may or may not be required, and may or may not be used for determining the fees or credits.

The printer device 110 includes any printer device that receives a print job request and executes the print job and has the ability to communicate with the aggregator server 130, such as via access to the internet, either directly through an internet connection or via the computing device 110. The word "printer device" as used herein encompasses any apparatus, such as a digital copier, bookmaking machine, facsimile machine, multifunction machine, etc., which performs a print outputting function for any purpose. The printer device 110 may further include an interface between the printer device and a mobile device and/or the mobile device.

The printer devices 110 may be a single printer device 110, a plurality of individual printer devices 110 that are not in data communication with one another, or an assembly of printer devices 150 including a plurality of printer devices 110 which are configured to be in data communication with at least one other printer device 110 of the group or with a printer server (not shown). The assembly 150 may use serverless distributed monitoring, as described in U.S. patent application Ser. No. 12/129,195, which is herein incorporated by reference in its entirety.

The printer assembly 150 may include a grid which includes at least one printer device 110. The printer devices 110 of the grid form a group in which the printer devices 110 collaborate by sharing loads and resources, such as workload, processing resources and/or storage resources. An interface may be provided between the grid and another computing device, such as a mobile device. The interface provides the interfaced computing device with communication to all of the printer devices 110 in the grid. The grid provides a secure environment in which all of the printer devices 110 in the grid are protected by security or hardware or software provided for the grid, such as firewalls. The grid communicates with the aggregation server 130 or other computing devices as one entity, thus protecting the identity and security of users of the printer devices 110 in the grid.

Nodes (printer devices 110) may join or leave the grid, but the advertising related functionality processing, storage and accessing meta-data) will carry on as long as there is at least one member in the grid. The degree of available functionality of the grid may be scaled up or down, depending on the number of printer devices 110 in the grid.

The printer devices 110 share metadata which may describe the user population and thus provide data relating to users of all of the printer devices 110 in the grid. Data related to the user population and the printer devices 110 included in the grid may be used for generating target information which the grid will provide to the aggregator server 130. Some of the printer devices 110 in the grid may potentially have users in common, and the aggregation of target information may improve the ability to effectively advertise with targeted advertisements. The target information will be searched by the aggregator server 130 for keywords associated with advertisers that the aggregator server 130 is providing a service to. People in the user population and printer devices 110 in the grid may be classified into a variety of categories (e.g., based on demography, subject matter of content of print jobs, printer device usage etc.). Target information submitted to the aggregator server 130 may be collected across the many categories and can then be used collectively by the aggregator server 130 to generate advertisements. This process creates social context and can increase the efficiency of advertising because of the similarities within the user population and printer device usage.

By collaborating, the printer devices 110 can learn from other printer devices 110 in the grid what they did not know themselves. Examples of information that could be shared across printer devices 110 within a grid are synonyms for a keyword, user categories, common contexts, advertisement strategies that led to effective verification in the past, etc. When one printer device 110 does not have stored information which it needs, the printer device may query other printer devices 110 in the grid for relevant information.

While storage is limited on the individual printer devices 110 and there is much information generated by a large user population. The printer devices 110 of the grid may share resources or partition workloads, such as for collecting target information, submitting information to the aggregator server 130, outputting ads to users and storing ads and/or information that can be used as target information.

The method of providing targeted and verifiable ads and the system 102 are now described in greater detail. Each printer device 110 includes a processing device 12, at least one storage device 114 or access to a storage device for storing software modules executable by the processing device 12, and a communication interface 116 including hardware and/or software necessary for providing data communication with the computing device 120 and/or the aggregator server 130. The data communication provided may be wired or wireless. The communication interface 116 may include, for example, a modem, a router, a cable, an Ethernet port, etc.

The printer device 110 may be included in one or more networks which provide for the data communication between the printer device 110 and the computing devices 120, provide for the data communication between the printer devices 110 of the assembly 50, and/or provide communication with the Internet for accessing the aggregator server 130. Alternatively, the printer device 110 may be directly connected, via a wired or wireless connection, with one or more of the devices it is communicating with.

The computing device 120 is a device such as a desktop computer, a mobile device such as a handheld computer or personal digital assistant (PDA), a cellular phone, a microcomputer or mainframe computer. The computing device 120 includes a processor 122, such as a CPU, at least one storage device 124 and/or access to a storage device for storing software modules executable on the processor of the CPU (the storage devices 124 or a portion thereof may be included with the CPU 122), a communication interface 126 including hardware and/or software necessary for providing data communication (wired or wireless) with the at least one printer device 110.

The at least one printer device 110 and the at least one computer device 120 may be provided in a variety of environments and configurations, such as in private settings, e.g., a private home or a business or corporate setting, or a public setting, e.g., a public computing and printing system at a public library or airport terminal. In addition, the printer device 110 and the computer device 120 may combined into a single device, such as a public kiosk provided at an airport terminal. Within the environment, if there are several printer devices 110 or computing devices 120, they may each be stand-alone devices or may networked to one another.

The aggregator server 130 includes a processing device 32, at least one storage device 34 or access to a storage device for storing software modules executable by the processing device 32 and a communication interface 36 including hardware and/or software necessary for providing data communication (wired or wireless) with the printer device 110 and/or the advertiser server 140. The communication interface 36 may include, for example, a modem, a router, a cable, an Ethernet port, etc.

The advertiser server 140 includes a processing device 42, at least one storage device 44 or access to a storage device for storing software modules executable by the processing device 42 and a communication interface including hardware and/or software necessary for providing data communication (wired or wireless) with the aggregator server 130. The communication interface 46 may include, for example, a modem, a router, a cable, an Ethernet port, etc. Data communication between the aggregator server 130 and the advertiser server 140 may be via a network, such as the Internet, an intranet, Ethernet, etc., or via a direct connection. The advertiser servers 140 are not necessarily in data communication with one another, other than, for example, via the Internet.

The software modules associated with the printer device 110 include a series of software instructions executable by the processor 12. The software modules are herein described as individual modules, but one or more of the software modules may be combined into a single module or overlap. The software modules include a content/context retriever (C/CR) module, an aggregator interface module, an ad delivery module, a history maintenance and access module, a glyph generator module, printer device accounting module, and a printer device transaction module.

The C/CR module provides for retrieving information based on a particular user or users of the printer device 110 or users in general of the at least one printer device 110. The information may be retrieved each time a job request is received, on a periodic basis or per administrator preferences. The term, user, as used herein, may refer to a particular user or a population of users using a printer device 110 or the printer assembly 150. The C/CR module searches the retrieved information for keywords, where respective keywords are associated with particular advertisers that administer the respective advertiser servers 140.

An example of a job request is a print job request which includes a file to be printed and data instructing the printer how to print the file. Examples of files to be included with the job request may include an email to be transmitted via email, an email to be printed or faxed, or a word processing or other document to be printed, faxed or attached to an email. The degree of searching is determined ahead of time, such as by an administrator of the printer devices 110 or by user settings. The degree of searching may be determined ahead of time through an agreement or contract with the respective advertisers. A first degree of searching may include searching only the file name of the file submitted with the print job request. A second degree of searching may include searching the content of the file to be printed and/or titles or content of directories browsed by the user. Such searching may include intelligent redaction in which sensitive information is redacted and/or secured and/or not selected by way of the search. Examples of sensitive redaction are described in U.S. patent application Ser. No. 11/129,156 which is incorporated herein by reference in its entirety.

The C/CR module further retrieves context information associated with the print job request. Context information includes, for example, the time and/or date of the job request, the identity of the source of the request, the geographical location of the source of the request, demographic information about user(s), browsing history of the user(s) and/or device usage information. The retrieved content and context information, also referred to herein as target information, may be stored, such as in a database stored by the storage device 112, such as linked to at least one of the user that submitted the job request, the computing device 120 that submitted the job request, or in general to the at least one computing device 120 that submits job requests to the at least one printer 110 or assembly 150. This information can be retrieved at a later date, such as for submission of target information to the aggregator server 130 at any time. Accordingly, the printer devices 110 or the printer assembly 150 may submit target information to the aggregator server 130 in real time as job requests are received or executed by the printer devices 110, or in batches, such as at regular timed or quantity intervals.

The target information gathered by the C/CR module remains within the environment of the printer devices 110 and the computing devices 120, and thus is protected by security, such as firewalls, provided for that environment. For a stand-alone kiosk or printer device 110, the secure environment may be limited to the printer kiosk or printer device 110 itself. For a network of printer devices 110 and computing devices 120, the secure environment may be limited to the network.

When the printer devices 110 are networked and/or configured as a printer assembly 150 (e.g., in a grid configuration), the target information may be social information that is relevant to a group of users that use the printer devices 110 in the network or printer assembly 150. The social information may be used collectively to generate advertisements targeted at the group of users, to sub-groups of the group of users (e.g., users of a selected one or more printer devices 110, such as for a particular department within a corporate environment) or to individual users, such as the user who submitted the job request. The variety of information available, such as via emails, print jobs and faxes, and the social aspect of the information provide a rich amount of information that is of interest to advertisers. Furthermore, availability of social information is conducive to efficiency in advertising because of similarities which exist within the group. Keywords from multiple users may be generated and clustered in a distributed fashion within the fleet using distributed monitoring and storage available by virtue of the fleet configuration.

The target information may include relevant history information maintained by the history maintenance and access module. The C/CR module may prompt ad generation by sending target information including only history information even when a job request is not processed by the printer assembly 150. This prompt may be triggered by an event, such as the occasion of a holiday or birthday or the occurrence of a local, national or global news event, or at regular time intervals. Relevance of the history information may be based on recent history, similarity to retrieved or recent content or context, relationships to retrieved or recent content or context, or related terms.

The aggregator interface module provides the target information to the aggregator server 130 and receives ads which the aggregator server 130 generated. The communication may be performed, for example, by means of a web-service call. The web-service call may include the web address of the source of the web-service call in order for the aggregator server 130 to respond. The aggregator interface module may stall execution (e.g., printing) of the submitted job request for a time period not to exceed a predetermined time interval until one or more ads are received from the aggregator server 130 and the ad is prepared for delivery with the job output to the user. If the aggregator server 130 does not respond within the predetermined time interval by providing one or more ads, the aggregator interface module will provide for having the job request executed without inclusion of the ad(s). The web-service call (or an additional one) may be used to retrieve targeted ads from the aggregator server 130. The web-service call may be time-sensitive.

The ad delivery module merges the ad(s) received from the aggregator interface module into the job output for delivery to the user, or generates an output in which the ad(s) are included. The ad may be delivered in a variety of forms, such as a printed or displayed advertisement, coupon, notice, announcement or digital message that may include a URL (e.g., provided via a hyperlink). For example, where the job is a print job, the ad may be included in the printout, such as on the back of a cover page, on a separator page of a workflow, in the margin of a page associated with the workflow, etc, thus utilizing paper that otherwise is likely to be discarded or wasted. The ad delivery module thus may interact with printer device software that manages document output for merging the ad into the output document so that it is included within the document. Merging the ad may include providing the ad as a separate output that is output immediately before or after the print job output so that it can be collected with the print job output.

Where the job is a fax, the ad may be directed to the sender and/or the recipient. The ads may be incorporated into an outgoing fax that is transmitted from the printer device 110, but in accordance with user preferences the ad delivery may be limited to delivery only at the printer device 110. The ad may be incorporated, for example, into a cover page of an incoming fax or a report page generated in association with an outgoing fax. Where the job is an incoming email, the ad may be incorporated into the email, such as in the form of a footer or header. Where the job is an outgoing email, the sender may receive an email or other notification from the printer device 110 that includes the ads. For all jobs, the printer device 110 may transmit an email or other notification to the user or the computing device 120 used by the user which includes the ads. Notifications may be sent from the printer device 110 to the user's computing device 120 via a printer driver which is a software module provided with the computing device 120 that is executable by the CPU 122. Notifications and ads sent via email or the printer driver may include a URL (such as provided via a hyperlink) and/or a printable ad, such as a coupon. A printer provided URL or hyperlink, when activated, such as by clicking on it, is directed to the aggregator server 130 and may provide a displayed or printable ad or coupon or provides a link that the user may use to access, for example, a printable ad, a coupon or a website. The printer device 110 may send an ad in a pop-up window that pops up on the monitor of the user's computing device 120 in response to a message sent by the ad delivery module to the printer driver software module. The pop-up ad may include the URL.

An ad including a notification message or a URL may be provided via a user interface (UI) provided with the printer device 110. The user may operate the printer device's 110 UI to type in a URL for performing a verification act and for accessing or printing information related to the advertiser or a coupon.

The history maintenance and access module maintains history information including a history of collected context and content information and a history of ads which were provided by the aggregator server 130. The history information may be maintained, for example, in a database stored on the storage device 14. The stored target information and the stored ads may be associated with a particular user, a particular computing device 120 and/or a particular printer device 110. The history information is accessible by a user either at a printer device 110 or a computing device 120, but may be password protected in accordance with administrative preferences. For example, a user may only have access to history information associated with that user or a particular computing device 120.

The glyph generator module generates a glyph or similar identifying data (such as an optical code (e.g., barcode), text or symbol) that may be embedded in a data communication output by the printer device 110 to the aggregator server 130 for showing authenticity of generation of the output by the printer device 110. The identifying data may identify the identity of the user, printer device 110 and/or the printer assembly 50, and may further identify an ad for which verification is being provided. For example, the glyph generator module may generate a glyph that is embedded in a data communication sent by the user to the aggregator, e.g., via a facsimile message. The aggregator server 130 will be able to detect the glyph upon receipt of the data communication. Detection of the glyph identifies and authenticates the origin of the data communication and provides confirmation that the user performed a verification action associated with the ad.

The printer device accounting module maintains an account associated with the aggregator and/or the advertisers. A variety of accounting schemes may be used. In the current example, the advertiser pays fees in accordance with the number of its ads that are verified. The aggregator determines when an ad has been verified. A percentage of the fees go to an owner of the printer devices 110, and a percentage of the fees go to the aggregator. The fees that go to the owner of the printer devices 110 may be used to pay for or subsidize operating costs of the printer devices 110, such as the cost of paper and toner. The printer device transaction module processes a financial transaction between the printer device 110 and the aggregator server 130 and/or the advertiser servers 140 for facilitating payment to the owner of the printer devices.

The software module associated with the computer device 120 includes a series of software instructions executable by the processor 12. The software module is herein described as an individual module, but be divided into more than one module. The software module includes a printer driver module which interfaces with at least one of the printer devices 110 for providing communication between the computer device 120 and the printer devices 110. The printer driver module may include a graphical user interface (GUI) which facilitates communication between a user of the computer device 120 and the printer devices. For example, the printer device 110 may send an ad to the user of the computer device 120 via the printer driver module, wherein the printer driver module displays the ad to the user in a pop-up window. The ad displayed in the pop-up window may include a URL and/or a hyperlink which the user can activate to verify the ad and/or to view advertised material or redeem a coupon.

The software modules associated with the aggregator server 130 include a series of software instructions executable by the processor 12. The software modules are herein described as individual modules, but one or more of the software modules may be combined into a single module or overlap. The aggregator server 130's software modules include an ad generator module, a verifier module, an aggregator accounting module and an aggregator transaction module.

The ad generator module receives the target information from the printer devices 110, receives ad generation criteria from the advertiser servers, matches received target information with ad generation criteria, generates one or more ads when a match is found, and delivers the ads to the source of the target information. The ad generation criteria may include a list of one or more keywords and may further include ad generation conditions. The matching may entail matching text included in the received target information with the one or more keywords. The tightness of the match required may be selectable by the user, operator of the printer assembly and/or the operator of the advertiser server. Tight matching may require an exact or close to exact match of letters which make up the text being compared. Loose matching may only require that the target information include a word which is similar to a keyword or related to the keyword. The degree or type of similarity or relation may be selectable. Types of similarity include different tenses or grammatical forms of the same word, synonyms, or similarity in meaning.

The matching may further entail determining that the target information satisfies one or more ad generation conditions. The ad generation conditions may include, for example, contextual conditions, an exclusivity condition, and/or a prioritization condition. Examples of contextual condition include a temporal and/or geographic range, such that a match will only be found for target information that has temporal and/or geographic data which satisfy the temporal and/or geographic range conditions specified in the ad generation criteria. An exclusivity condition may exist when the advertiser has an exclusivity arrangement. An advertiser may be required to pay of extra fees to have an exclusivity arrangement, and this entitles the advertiser's ad to be the exclusive ad generated when a match is found between received target information and ad generation criteria.

A prioritization condition establishes a prioritization between two or more advertisers whose ad generation criteria match the target information. The advertisers may be charged additional fees in order to be accorded a higher priority level. When a particular advertiser has an exclusivity arrangement and its priority level is higher than other advertiser's priority levels whose ad generation criteria match the same target information, only the particular advertiser's ad will be generated and delivered to the source of the target information. When there is not an exclusivity arrangement, depending upon the arrangement, all or one or more of the ads whose ad generation criteria match the target information may be generated and delivered to the source of the target information. If selected ads are generated and delivered, they may be selected based on the prioritization levels of the advertisers associated with the ads. The opportunity to provide an ad may be auctioned off among advertisers which are interested in advertising based on the target information.

The ad generation module determines that received target information matches with ad generation criteria when one or more keywords included in the ad generation criteria are included in the received target information and any contextual conditions are met. The degree of similarity between the keywords and the terms included in the target information necessary to constitute a match may be selectable and may be tied to contractual terms. The advertiser may be required to pay additional fees for looser matching criteria.

The ads are generated in accordance with advertiser preferences as prearranged between the advertiser and the aggregator. For example, the format and layout of a printable or displayable ad may be prearranged. The layout may be standard or customized.

The ad generation module delivers the generated ad(s) to the source of the target information via the communication pathway between the aggregator server 130 and the at least one printer device 110. The delivery may be directed to the printer assembly 150 in general or a specific printer device 110 of the at least one printer device 110, e.g., the printer device 110 to whom the job request associated with the received target information was submitted. In addition, instructions may be included with the ad for delivery to the user. The delivery may be to a particular user (e.g., the user that generated the job request for which the target information was generated) or any user of the printer device 110. In one example, the ad includes instructions for delivery by the specific printer device 110 to one or more of the computing devices 120, e.g., via the printer drivers of the computing devices 120. In another example, the ad includes instructions for the printer device 110 to print the ad and/or to display the ad on a user interface provided on the printer device 110. The instructions for delivery may also include a request for the printer device 110 to save the ad (or to not save the ad) for future access by a user (the user may be limited to a specific user if so desired).

The verifier module determines when a predetermined action, herein referred to as verification action, has been performed by the user with respect to a received ad. The verification action verifies a usage of the ad. The verification action is specified at the time when the advertiser signs up for the service provided by the aggregator. Exemplary verification actions include redeeming a coupon provided with an ad, activating a URL provided by the printer device 110 with an ad, performing a user action which confirms receipt of the ad, such as faxing a copy of the ad to a facsimile machine associated with the aggregator or responding to the ad by entering a response in a pop-up window, sending a response via a website named in the coupon, and/or sending an email to the aggregator, where the email includes information that confirms receipt of the coupon. Redemption of a coupon may be performed online or physically, such as by physically presenting the coupon to a merchant at the merchant's physical place of business.

In the present example, each verification action is directed at or received by the aggregator and includes providing the aggregator with information that identifies the advertiser associated with the ad being verified. However, some verification actions are more readily performed by the user interacting directly with the advertiser, such as physical redemption of a coupon, or visiting a website associated with the advertiser. In such instances, the aggregator needs to be notified that the verification action was performed.

Notification may be provided by the user or the advertiser, however there may be a disincentive for the advertiser to provide such notification, since the fees that the advertiser is charged are proportionate to the number of ads that are verified by verification of performance of the verification action. Accordingly, reliability may be maximized by providing notification to the aggregator server 130 via the user or a user action. The user action may be performed at the printer device 110 or a different device. For example, where the verification action is activation of a URL, the URL may be activated at the user's computing device 120 or at a user interface (e.g., a GUI) provided with the printer device. The verification module may display the URL to the user and/or provide a browser by which the user can select the URL, where the display or browser are provided at the user's computing device 120 or the printer device 110. Alternatively, the user may type in the URL at the computing device 120 or via a user interface at the printer device 110.

Since the aggregator server 130 provides the ads directly to the user and receives notification from the user via a user action, the user, the printer device 110 and the printer assembly 150 may remain anonymous to the advertiser. This is desirable for two reasons. First of all, the user's identity is protected for security purposes. Second of all, if the advertiser were able to independently make direct contact with the user after an initial contact established by the aggregator server 130, the advertiser could bypass the aggregator server 130 for future advertising and access the user directly.

The verifier module provides feedback information to the advertiser server 140 when a verification action is performed verifying an ad for the advertiser associated with the advertiser server to inform the advertiser server 140 of the verification. The feedback information may only identify the printer assembly 150 with which the verification action is associated. In this way, all users of the printer assembly 150 appear as one entity to the advertiser server 140 without revealing any personal or account information about the users to the advertiser server 140. For example, a verification activity may be reported to the advertiser server 140 (e.g., in a computer understandable format, such as XML, etc.) as follows: "A user belonging to a 5000 member account (in this case the printer assembly owner prefers that the account name not be revealed) in the Webster, N.Y. area printed and marked on an automobile services ad (exact ad identifier is revealed) at 5 pm EST." In this example, "marked on" refers to scanning in the advertisement, or a portion thereof, and submitting it to the aggregator server 130 by a printer device 110 (e.g., via email or fax) with a validation mark, such as the user's signature or a glyph embedded by the printer device 110 provided on the submitted document (i.e., scanned in ad).

The aggregator accounting module keeps an accounting of the fees which are to be charged to the respective advertisers. The fees are generally associated with notification via a verification action that receipt of an ad was verified by a user, and special arrangements for advertisement generation, such as exclusivity or prioritization arrangements. The service provided to the users and/or the owner of the printer devices 110 may be provided free of charge, with the aggregator operating based on the revenues received by the advertisers. Furthermore, the aggregator may pass on a percentage of the revenues associated with ad verification to the owner of the printer devices 110. As a result, the owner of the printer devices 110 and/or the users benefit by receiving coupons and discounts provided by the advertisers via the ads, and some revenue which supplements, covers or exceeds the cost of operating the printer devices. Such costs include, for example, toner, paper and/or any maintenance charges.

The aggregator may provide services to many individual printer assemblies. These printer assemblies may be independent of one another and owned and/or operated by different entities. The advertisers may have access to all or some of the printer assemblies, such as according to the contract executed by the advertiser and/or the owner of the printer assembly with the aggregator.

The aggregator transaction module processes transactions between the aggregator and the owner of the printer devices 110 and/or the advertiser based on accounting reports generated by the aggregator accounting module. The transaction module may interact with financial institutions associated with each of the parties to facilitate the transactions. The aggregator transaction module may delay consummation of a transaction if there is a discrepancy in the amount of money to be exchanged. The same is true for the printer device or transaction module and/or transaction modules associated with the advertiser servers 140.

The software modules associated with the respective advertiser servers 140 each include a series of software instructions executable by the processor 142 and include modules for ordering ads with the aggregator server 130, keeping an accounting and facilitating transactions with the aggregator server 130.

Figure 5:
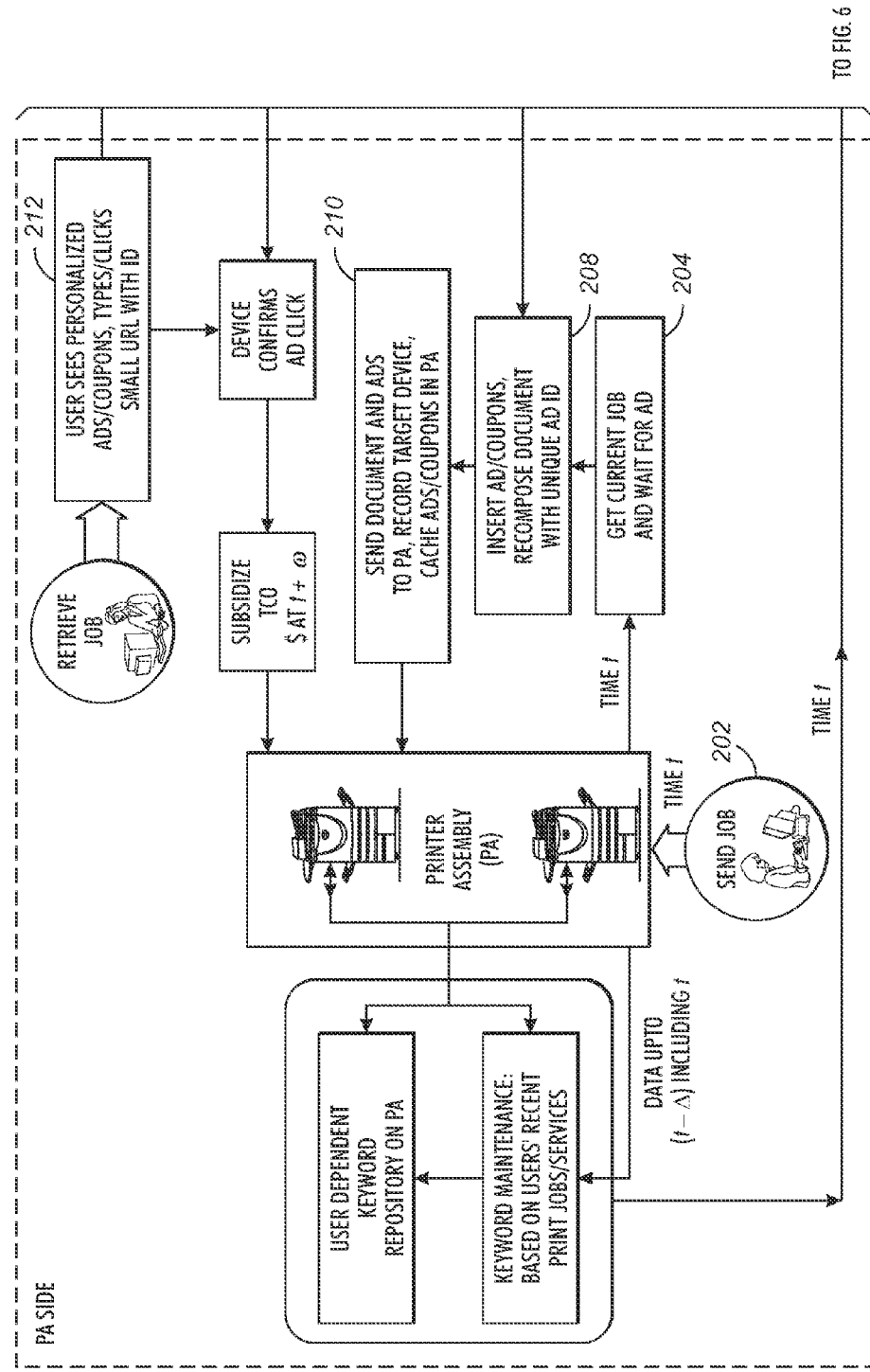
FIGS. 5 and 6 are flow diagrams showing operation of the system according to FIG. 3.

With reference to FIG. 5, operation of a system of monetizing information according to this disclosure is described in the context of generation of an exemplary ad. At step 202, the user sends a job request to a printer device 110 or the printer assembly 150 at time 1. The C/CP module of the printer assembly 150 (or a particular printer device 110 if the job request was sent to the particular printer device 110) receives the job request and retrieves keywords and dispatches them to the aggregator server 130. A keyword history may be stored in the storage device 112 for a predetermined interval of time designated as (t-.DELTA.) time units. At step 204, one of the printer devices 110 of the printer assembly 150 (the target printer device 110) is selected to process the job and waits for the receipt of the ad or ads before actually processing the job. At step 206, the ad generation module of the aggregator server 130 quickly generates one or more ads.

At step 208, the ad delivery module merges the generated ad(s) with the job output (e.g., in the cover page). At step 210, the ad(s) are delivered, which in the current example may include as merged with the printed output of the job. This step may further include providing notification to the aggregator server 130 of output to the user (e.g., printing, transmitting via email or displaying) of the respective ads for the purpose of ad verification. This notification may be omitted when output of the ad is not a criterion for ad verification. The ad(s) and/or the identity of the target printer device 110 may be stored in storage device 12. The ad may be temporarily stored in the device (e.g., cached) for a predetermined period of time before purging it from the printer assembly 50, grid or printer devices 110. The printer assembly 150 may provide notification to the aggregator server 130 of output of each respective ad for the purpose of verification depending on the type of verification agreed upon by the parties (i.e., the printer assembly owner, the aggregator and the respective advertisers). At step 212, the user retrieves the job output, views the ad(s) and may respond to the ad(s) by performing a verification action associated with each ad, such as by entering a URL at a user interface provided with the target printer device 110 or clicking on a URL provided at the user interface.

At step 214, the response to the ad(s) is recognized by the verifier module of the aggregator server 130 for the purpose of ad verification. The response to an ad may include clicking on a pop-up window displayed at the computing device 120, faxing or scanning in and then sending the ad to the aggregator or aggregator server 130 after checking selected checkboxes provided on the ad, and/or responding to an email provided by the aggregator server 130. The fax may include an insertion such as a glyph or optical code (e.g., barcode), text or symbol generated and inserted by the printer device 110 which provides information to the aggregator 130 useful for establishing verification. Step 214 may be omitted when performance of a user verification action is not a criterion for ad verification.

At step 10216, the aggregator server 130 records the received response to the ad(s) and determines payment owed by the advertiser and to the printer assembly 150 in accordance with pay-per-verification accounting. Payment may be determined between the aggregator and the advertiser at time t and then between the aggregator and the printer assembly owner at time t+.omega. Payment is based on ad verification for each ad using the ad verification method of choice, which may include verification of output to the user (e.g., printing, transmitting by email, or displaying) of the ad and/or performance of a user verification action associated with the ad (e.g., activating a URL or returning by email or fax a scanned in marked-up ad). At step 218, the aggregator pays the printer assembly owner using the respective transaction modules. This may be performed as per a pre-established schedule.

Figure 6:
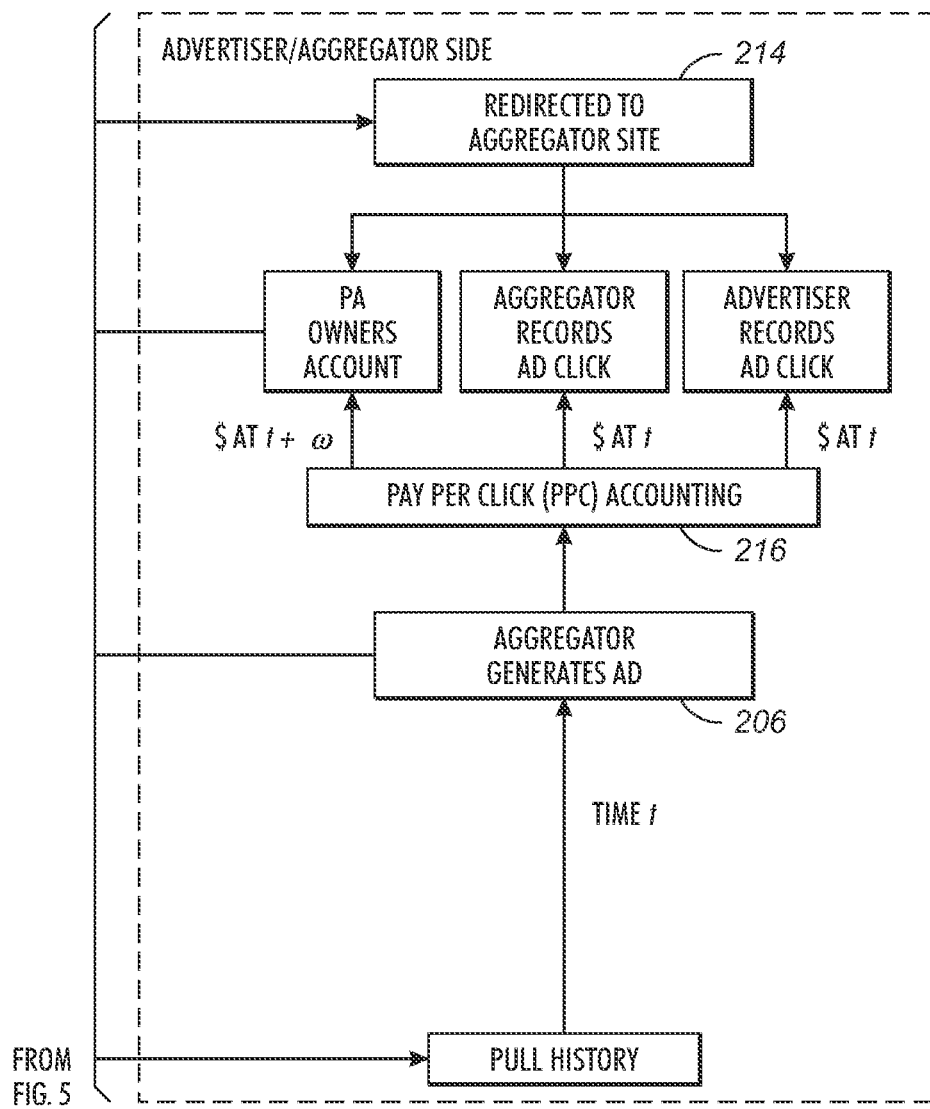

FIG. 6 shows steps performed by the aggregator server 130 for generating and verifying targeted ads. At step 302, the aggregator server 130 receives and stores ad generation criteria from an advertiser server. At step 304, the target information is received from the printer assembly 150. At step 306, the aggregator server 130 compares the received target information with the stored ad generation criteria. At step 308, at least one ad is generated based on the results of the comparison, e.g., when a match is found. At step 310, the aggregator server 130 delivers the at least one ad to the printer assembly 150.

At step 312, the aggregator server 130 determines whether ad verification has been performed for the generated ads. The ad verification may include receipt of notification of a predetermined verification action performed by a user of the printer assembly 150 associated with the respective ads and/or notification that the respective ads were output to a user. The verification act verifies a usage of the delivered ad. At steps 314 and 316, the advertiser associated with each verified ad is charged for the verified ad and the owner of the printer assembly 150 is credited for each verified ad delivered to the printer assembly 150 or a user thereof. The amount charged and credited may vary depending on the type of ad verification used.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of providing user requested printed material and one or more targeted communications to a user of a printing system, the method comprising:
   a) the printing system acquiring material to be printed on a printing device to produce the user requested printed material, the printing device associated with the printing system;
   b) the printing system acquiring the one or more target communications associated with the user requested printed material; and
   c) the printing system printing the user requested printed material utilizing the printing device and providing the acquired one or more targeted communications to the user,
   wherein the one or more targeted communications are associated with one or more bids of a GSP (Generalized Second Price) auction, the GSP auction configured to accept a plurality of bids from a plurality of respective bidders, each bidder biding on providing a respective targeted communication to the user, and a reserve price v* is associated with the auction, where $$\alpha J(v^*) = c, \text{ and } J(v) = v - \frac{1 - F(v)}{f(v)},$$

and
   F( ) represents the distribution function of the valuation v,
   f( ) represents the probability function of the valuation v,
   $\alpha$ represents the revenue share with ad aggregator ($0 \le \alpha \le 1$), and
   c represents the unit cost of printing, scanning, faxing, etc. for one advertisement associated with a user response to the advertisement.

2. The method according to claim 1, wherein a plurality of attributes are associated with one or more of the user requested printed material, the printing device and the user, and the one or more targeted communications are associated with one or more of the plurality of attributes.

3. The method according to claim 1, wherein the bidders bid on an information good associated with potential attributes of one or more of the printed material, the user and the printing device.

4. The method according to claim 3, the information good including meta-data associated with the potential attributes of one or more of the printed material, the user and the printing device.

5. The method according to claim 3, wherein the information good is one or more of:
   an age of the user;
   a sex of the user;
   a location of the user;
   a location of the printing device;
   a keyword associated with the printed material;
   a time associated with one or more of the steps a), b) and c).

6. The method according to claim 1, further comprising:
   the user communicating to the printing system the material to be printed on the printing device in step a);
   a user interface associated with the printing system communicating instructions to the user to select one of b1) printing the material and the user receiving the one or more targeted communications, and b2) printing the material and the user not receiving the one or more targeted communications;
   if the user selects b1), the printing device printing the material and the user receiving the one or more targeted communications, and if the user selects b2), the printing device printing the material and the user not receiving the one or more targeted communications.

7. The method according to claim 1, wherein the one or more targeted communications are one or more of a printed document, a video display and an audio signal.

8. The method according to claim 1, wherein a verification action is performed by the user, the verification action indicating the user has read at least one target communication and the verification action is one or more of:
   forming a small image near the targeted communication;
   forming a small image on the targeted communication;
   forming a color variation on or near the targeted communication;
   tagging or encircling all or a portion of the targeted communication;
   marking the targeted communication with an ink;
   scratching all or a portion of the targeted communication;
   striking through all or a portion of the targeted communication;
   forming a check mark on or near the targeted communication;
   providing a biometric information on or near the targeted communication;
   removing a portion of a document on or near the targeted communication;
   typing a hyperlink into a user interface;
   clicking on a hyperlink with an input device;
   measuring a length of a document comprising the targeted communication;
   tapping a portion of a document comprising the targeted communication when the document is placed on a pressure sensitive reader;
   disfiguring a portion of a document comprising the targeted communication;
   scratching off a portion of an ink on a document comprising the targeted communication;
   producing a specific sound by striking a document comprising the targeted communication;
   providing at least one specific electromagnetic frequency to a device;
   detecting a folded portion of a document comprising the targeted communication;
   scanning a one dimensional bar code, a two dimensional bar code, a color code, a glyph or a QR code;
   facsimile transferring all or a portion of a document comprising the targeted communication;
   placing a RFID device proximate a device associated with the targeted communication wherein the RFID device is associated with the user.

9. The method according to claim 1, wherein a verification action is performed by the user, the verification action indicating the user has read one or more targeted communications and the verification action is performed by the user at a device operatively associated with the printing system.

10. The method according to claim 1, wherein the user accesses the one or more targeted communications via one or more of a computer, the printing device and a cellular phone.

11. The method according to claim 1, wherein the one or more targeted communications are advertisements.

12. The method according to claim 1, wherein the bidders bid for placement locations of a targeted communication on a media, the highest bid associated with a placement of the targeted communication in an area of the media with a highest probable response rate, relative to other areas of the media.

13. The method according to claim 12, wherein a plurality of probable response rates are calculated for a plurality of areas associated with the media.

14. The method according to claim 13, wherein the plurality of probable response rates are determined before the auction.

15. The method according to claim 14, wherein the plurality of probable response rates are updated during the auction based on a verification action performed by the user, the verification action indicating the user has read one or more of the targeted communications.

16. A method of providing user requested printed material and one or more targeted communications to a user of a printing system, the printing system comprising a printing device and an Ad (advertisement) Aggregator Server operatively connected to the printing device, and a print server operatively connected to the Ad Aggregator Server and the printing device, the method comprising:
   a) the printing device acquiring material to be printed on the printing device to produce the user requested printed material;
   b) the printing device acquiring one or more targeted communications from the Ad Aggregator Server, the one or more targeted communications associated with the printed material; and
   c) the printing device printing the user requested printed material and one of the printing device and the print server providing the acquired one or more targeted communications to the user,
   wherein the one or more targeted communications are associated with bids of a GSP (Generalized Second Price) auction, the GSP auction configured to accept a plurality of bids from a plurality of respective bidders, each bidder bidding on providing a respective targeted communication to the user, and a reserve price v* is associated with the auction, where $$\alpha J(v^*) = c, \text{ and}$$

$$J(v) = v - \frac{1 - F(v)}{f(v)},$$

and
   F( ) represents the distribution function of the valuation v,
   f( ) represents the probability function of the valuation v,
   $\alpha$ represents the revenue share with ad aggregator ($0 \le \alpha \le 1$), and
   c represents the unit cost of printing, scanning, faxing, etc. for one advertisement associated with a user response to the advertisement.

17. The method according to claim 16, wherein a plurality of attributes are associated with one or more of the user requested printed material, the printing device and the user, and the one or more targeted communications are associated with one or more of the plurality of attributes.

18. The method according to claim 16, wherein the bidders bid on an information good associated with potential attributes of one or more of the printed material, the user and the printing device.

19. The method according to claim 18, wherein the information good is one or more of:
   an age of the user;
   a sex of the user;
   a location of the user;
   a location of the printing device;
   a keyword associated with the printed material;
   a time associated with one or more of the steps a), b) and c).

20. The method according to claim 16, wherein a verification action is performed by the user, the verification action indicating the user has read one or more targeted communications and the verification action is performed by the user at a device operatively associated with the printing system.

21. The method according to claim 16, wherein the user accesses the one or more targeted communications via one or more of a computer, the printing device and a cellular phone.

* * * * *